United States Patent [19]
Luther et al.

[11] Patent Number: 6,120,193
[45] Date of Patent: Sep. 19, 2000

[54] SPLICE HOUSE SUBASSEMBLY AND ASSOCIATED CONNECTOR

[75] Inventors: James P. Luther; Thomas Theuerkorn, both of Hickory, N.C.

[73] Assignee: Siecor Corporation, Hickory, N.C.

[21] Appl. No.: 08/995,176

[22] Filed: Dec. 22, 1997

[51] Int. Cl.[7] .................................................. G02B 6/255
[52] U.S. Cl. .............................................................. 385/99
[58] Field of Search ........................... 385/80–88, 90–99, 385/147

[56] References Cited

U.S. PATENT DOCUMENTS

| | | | |
|---|---|---|---|
| 4,512,628 | 4/1985 | Anderton | 385/135 |
| 4,824,198 | 4/1989 | Anderton | 385/135 |
| 4,842,362 | 6/1989 | Anderton | 385/135 |
| 4,958,903 | 9/1990 | Cobb et al. | 385/135 |
| 5,469,522 | 11/1995 | Fan | 385/98 |
| 5,825,962 | 10/1998 | Walters et al. | 385/135 |

*Primary Examiner*—Akm E. Ullah

[57] ABSTRACT

The splice housing assembly provides a non-activated mechanical splice that provides temperature compensation such that the resulting splice is substantially unaffected by temperature fluctuations, thereby permitting the splice housing assembly to be formed of relatively inexpensive materials, such as plastic. The splice housing assembly includes a splice tube having a first end that is attached to an end portion of the first optical fiber. The splice housing assembly also includes a temperature compensator disposed at least partially within the splice tube. The temperature compensator defines an opening through which the end portion of the second optical fiber extends. The first end of the temperature compensator is attached to the second optical fiber and the second end of the temperature compensator is attached is the splice tube. Advantageously, the temperature compensator and the splice tube are formed of different materials that are selected such that differences between the expansion and contraction of the splice tube and the optical fibers that arise as a result of temperature variations are at least partially offset by changes in length of the temperature compensator.

16 Claims, 3 Drawing Sheets

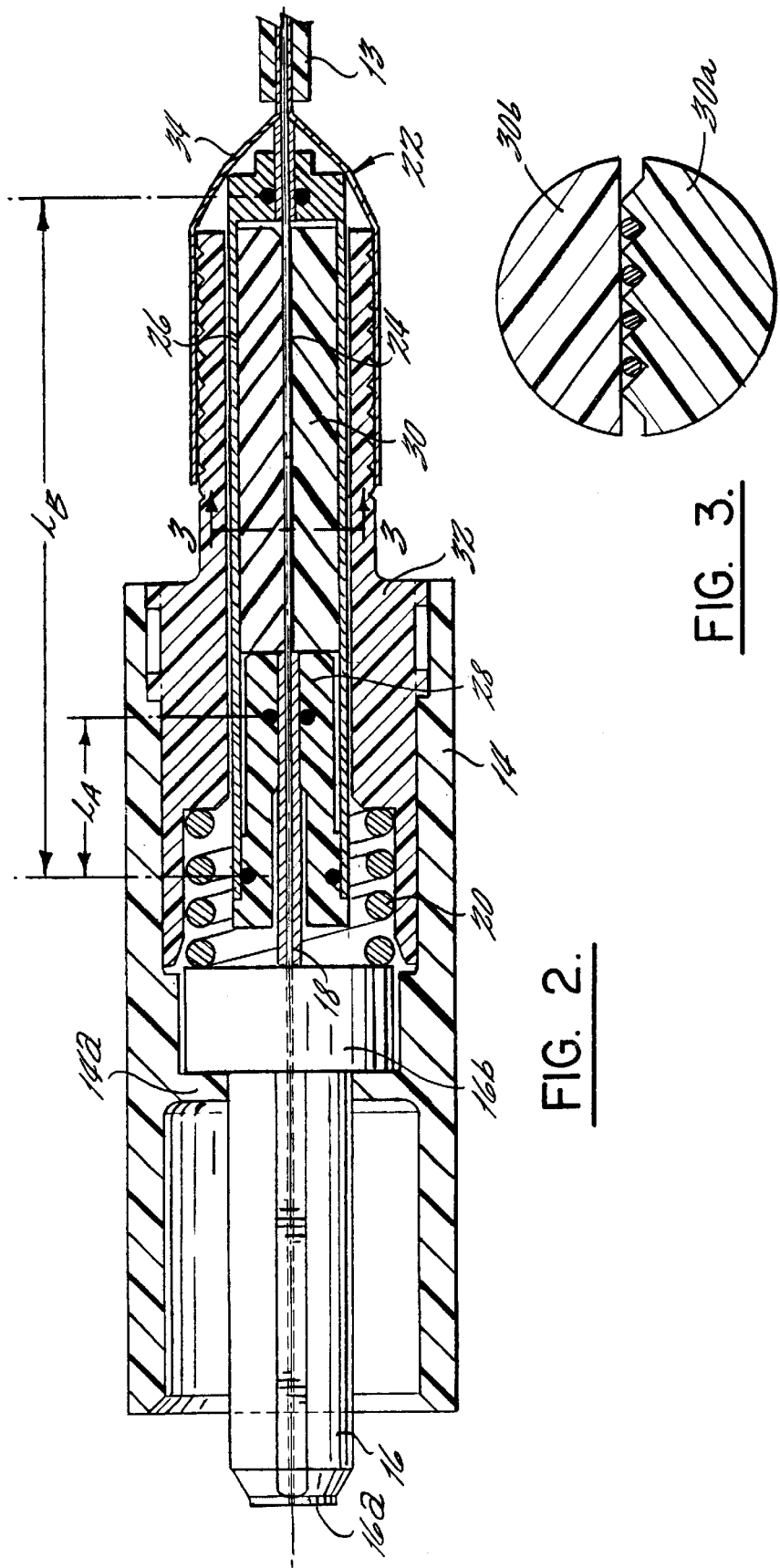

6,120,193

SPLICE HOUSE SUBASSEMBLY AND ASSOCIATED CONNECTOR

FIELD OF THE INVENTION

The present invention relates generally to mechanical splice housings and, more particularly, to non-activated mechanical splice housings that provide temperature compensation.

BACKGROUND OF THE INVENTION

It is desirable in many instances to splice optical fibers. For example, a relatively short length of optical fiber upon which a ferrule has been previously mounted may be spliced to a longer length of optical fiber in the field in order to facilitate the connectorization of the resulting spliced optical fiber. Thus, the ferrule can be mounted upon a relatively short length of optical fiber or pigtail at the factory in order to simplify the connectorization of the resulting spliced optical fiber in the field.

In order to properly splice the optical fibers as well as to protect the resulting splice, a number of mechanical splice housings have been developed. One of the initial mechanical splice housings included an outer housing formed of fused quartz. Since the fused quartz had approximately the same coefficient of thermal expansion as the optical fiber, the entire splice housing would expand and contract in approximately equal amounts as the temperature increased and decreased, respectively. While the mechanical splice housings that include a fused quartz outer housing can generally protect the spliced optical fibers from damage as the temperature fluctuated, the fused quartz outer housing was prohibitively expensive, particularly in comparison to the material costs of other types of housing.

In order to reduce the material costs of the mechanical splice housing and to provide improved impact strength or impact resistance, mechanical splice housings formed of plastic and other materials, such as metal and ceramic, were designed. Unfortunately, plastic housings have large coefficients of thermal expansion relative to the optical fibers. As such, the plastic housings expand and contract to a much greater degree than the optical fibers upon which the plastic housings are mounted. While housings mode of other materials, such as metal or ceramic, may not have a coefficient of thermal expansion as large as plastic housings, housings made of these other materials still expanded and contracted to a greater degree than the optical fibers upon which the housings are mounted. As a result, the quality of the splice tends to degrade as the temperature fluctuates, thereby resulting in inconsistent optical performance of the resulting mechanical splice.

In order to fix the respective end portions of the optical fibers in place regardless of fluctuations in the temperature, mechanical splice housings that require activation have been developed. For example, Siecor Corporation has developed CamSplice® connectors and CamLite® connectors for establishing and protecting mechanical splices. These connectors require external activation, such as activation of a cam, to clamp the respective end portions of the optical fibers within the mechanical spliced housing. As such, temperature fluctuations will not affect the quality of the mechanical splice.

In addition, connectors, such as the FuseLite® connectors also developed by Siecor Corporation, have been developed which fuse the respective end portions of the spliced optical fibers such that the resulting splice is not adversely affected by temperature fluctuations. Unfortunately, mechanical splices that require external activation as well as fusion splice techniques require a technician to perform additional operations in order to successfully splice the optical fibers. As a result, these splicing techniques may introduce still additional sources of expense and error to the splicing process.

Notwithstanding the variety of splice housings and techniques currently available, it would still be desirable to provide a non-activated, mechanical splice which utilizes relatively inexpensive components, such as plastic components, but which protects the resulting mechanical splice as the temperature fluctuates.

SUMMARY OF THE INVENTION

The present invention relates generally to a splice housing assembly which provides a non-activated mechanical splice and which provides temperature compensation such that the resulting splice is substantially unaffected by temperature fluctuations, thereby permitting the splice housing assembly to be formed of relatively inexpensive materials, such as plastic. Additionally, one embodiment of the present invention is directed to a connector that includes a splice housing assembly which provides temperature compensation. However, the splice housing assembly can be utilized in applications that do not require a connector without departing from the spirit and scope of the present invention.

The splice housing assembly includes a splice tube extending lengthwise between opposed first and second ends and defining a lengthwise extending passageway. The first end of the splice tube is adapted to receive and be attached to an end portion of the first optical fiber. The splice housing assembly also includes a temperature compensator disposed at least partially within the passageway of the splice tube. The temperature compensator extends between opposed first and second ends and defines an opening through which the end portion of the second optical fiber extends. The first end of the temperature compensator is adapted to be attached to the second optical fiber and the second end of the temperature compensator is attached is the splice tube. According to the present invention, the temperature compensator and the splice tube are formed of different materials that are selected such that differences between the expansion and contraction of the splice tube and the optical fibers that arise as a result of temperature variations are at least partially offset by changes in length of the temperature compensator. By utilizing a temperature compensator to at least partially compensate for differences in the expansion and contraction of the splice tube and the optical fibers, the integrity of the resulting mechanical splice is maintained even though the mechanical splice is non-activated and is generally formed of less expensive materials, such as plastic, which expand and contract to a much greater degree than the optical fibers.

In addition to the splice housing assembly, the connector of the present invention also includes a housing extending between opposed first and second ends and defining a lengthwise extending passageway. The connector of the present invention also includes a ferrule mounted upon the end portion of the second optical fiber. The ferrule is at least partially disposed within the passageway defined by the housing proximate the second end of the housing. In addition, the splice housing assembly is at least partially disposed within the passageway defined by the housing proximate the first end of the outer housing. Accordingly, the connector of the present invention permits a relatively short length of optical fiber having a ferrule mounted upon the end portion thereof to be spliced to a longer length of optical fiber in the field in such a manner that subsequent temperature fluctuations do not adversely affect the optical interconnection provided by the mechanical splice even though the components of the connector expand and contract in different amounts than the optical fibers.

BRIEF DESCRIPTION OF THE DRAWINGS

FIG. 2 is a cross-sectional view of the internal portion of the connector of FIG. 1 taken alone line 2—2.

FIG. 3 is a schematic cross-sectional view of the splice housing assembly of one embodiment of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 4:
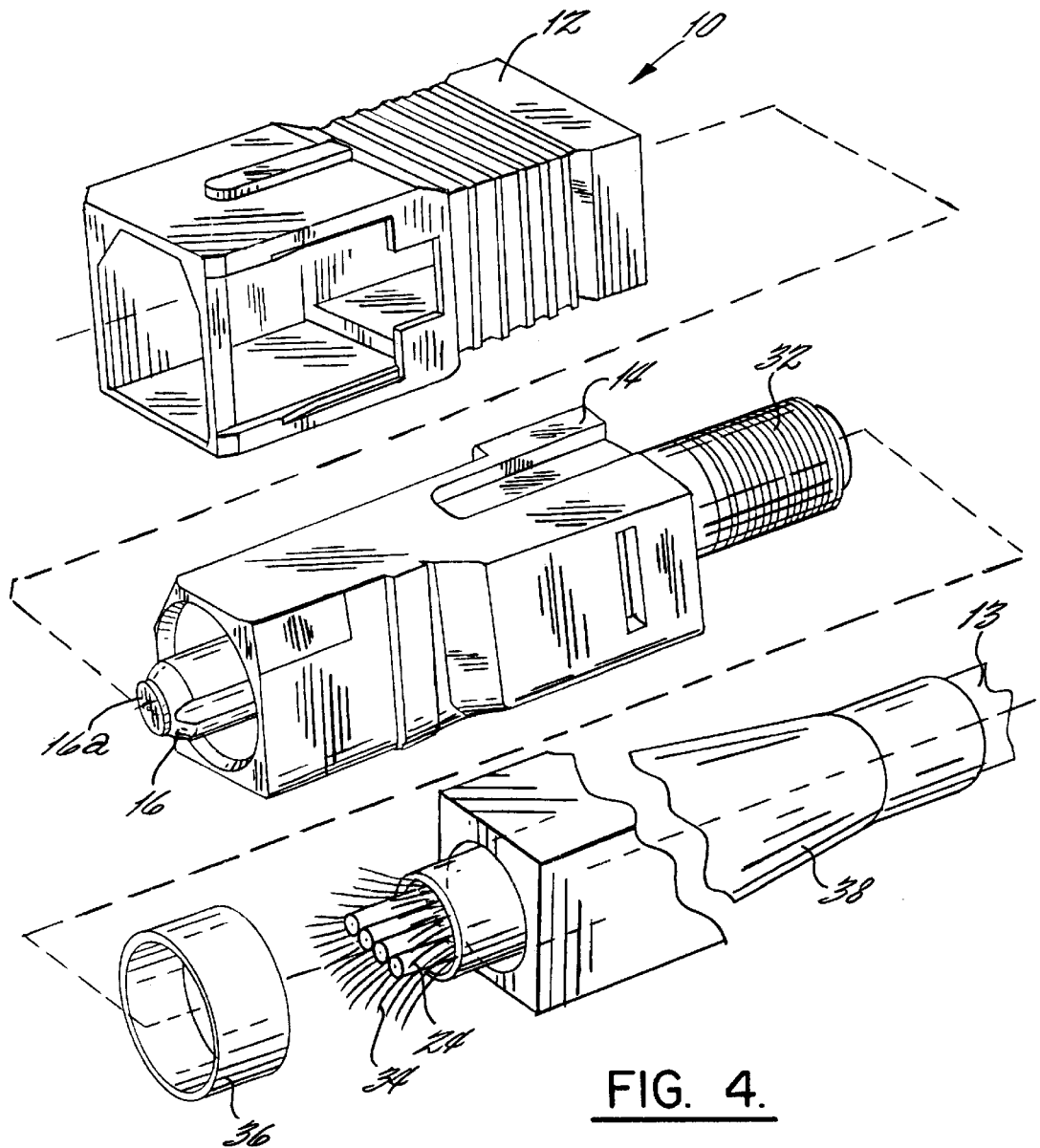
FIG. 4 is an exploded perspective view of a connector according to one embodiment of the present invention.

Referring now to FIG. 4, an exploded perspective view of one embodiment of a connector 10 of the present invention is provided. The connector includes an outer housing 12 and an inner housing 14, typically formed of a plastic material, mounted upon the end portion of a fiber optic cable 13 that includes one or more optical fibers. Although the outer and inner housings of the connector of the present invention can be shaped and sized as desired without departing from the spirit and scope of the present invention, the outer and inner housings of one advantageous embodiment of the present invention are the outer and inner housings which are commonly utilized in conjunction with SC, DC and QC connectors that are mounted upon the end portions of one, two and four optical fibers, respectively. As known to those skilled in the art, the outer housing is typically snap-fit onto the inner housing. However, the outer housing and the inner housing can be attached in other manners without departing from the spirit and scope of the present invention. Still further, the connector can include a single housing, as opposed to separate outer and inner housings as illustrated in FIG. 4, without departing from the spirit and scope of the present invention.

Figure 1:
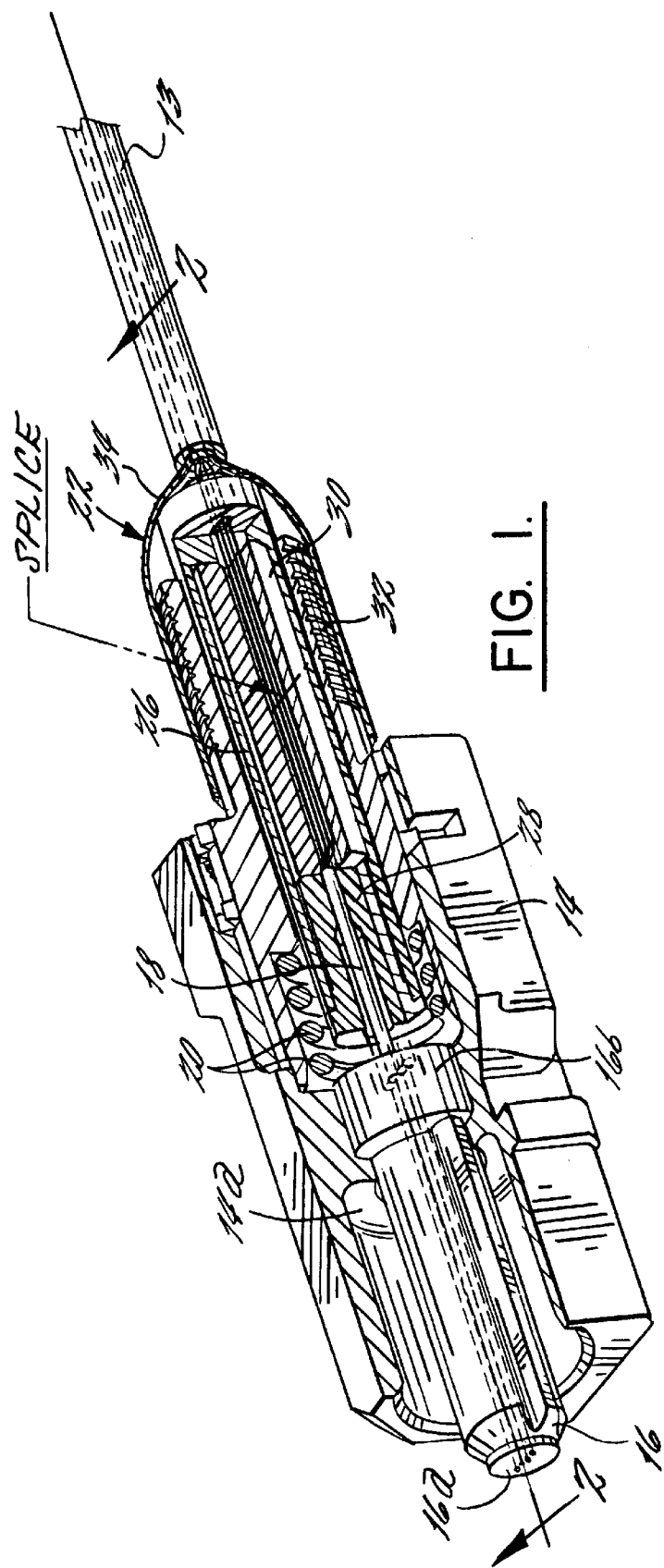
FIG. 1 is a cutaway perspective view of the internal portion of a connector according to one embodiment of the present invention in which the outer housing, the crimp band and the boot have been removed.

As shown in more detail in FIGS. 1 and 2, the connector 10 also includes a ferrule 16 that is mounted upon the end portion of one or more optical fibers 18 from which the buffer jacket has been stripped. Typically, the ferrule is mounted upon the end portion of the first optical fiber by means of an adhesive or epoxy. Although the connector of the present invention can include single and multifiber ferrules of a variety of shapes and sizes, the connector of one advantageous embodiment includes the ferrule which is utilized by conventional FC, DC or QC connectors and which is mounted upon the end portions of one, two or four optical fibers, respectively.

As illustrated, both housings generally extend between opposed first and second ends and define a lengthwise extending passageway. Typically, the outer housing 12 is attached to the inner housing, such as in a snap-fit relationship, such that the outer housing surrounds and is slidably disposed relative to the inner housing. As such, the inner housing is generally disposed within the passageway defined by the outer housing.

In turn, the ferrule 16 is at least partially disposed within the passageway defined by the inner housing 14 proximate the second end of an inner housing. As shown in FIG. 1, the connector 10 can also include a spring 20 for biasing the ferrule such that the leading end 16a of the ferrule extends through the second end of the inner housing for alignment and interconnection with another ferrule. The ferrule is retained at least partially within the passageway defined by the inner housing, such as by the engagement of a shoulder defined by the enlarged rear portion 16b of the ferrule with a flange 14a extending inwardly into the passageway defined by the inner housing.

The connector 10 also includes a splice housing assembly 22 for optically connecting the optical fibers 18 upon which the ferrule 16 is mounted (hereinafter referred to as the second optical fiber) with other, typically longer, optical fibers 24 (hereinafter referred to as the first optical fiber). The splice housing assembly is at least partially disposed within the passageway defined by the inner housing proximate the first end of the inner housing 14. As shown more particularly in FIGS. 1 and 2, the splice housing assembly typically extends rearwardly beyond the first end of the inner housing.

The splice housing assembly 22 includes a splice tube 26 extending lengthwise between opposed first and second ends and defining a lengthwise extending passageway. As shown by FIGS. 1 and 2, the first end of the splice tube is adapted to receive and be attached to the end portion of the first optical fiber 18. Although the splice tube can be formed of a variety of materials, the splice tube is typically formed of a relatively inexpensive plastic tube which has a much larger coefficient of thermal expansion than the glass which forms the optical fibers.

The splice housing assembly 22 also includes a temperature compensator 28 disposed at least partially within the passageway of the splice tube 26. The temperature compensator extends between first and second opposed ends and defines an opening through which the end portion of the second optical fiber 24 extends. The first end of the temperature compensator is adapted to be attached to the end portion of the second optical fiber, while the second end of the temperature compensator is attached to the splice tube and, more preferably, the second end of the splice tube. As shown in FIG. 2, the outer diameter of the first end and the medial portion of the temperature compensator can be somewhat smaller than the outer diameter of the second end of the temperature compensator to permit at least a portion of the temperature compensator to freely expand in the radial direction.

The splice tube 26 can be attached to the first optical fiber 18 and to the second end of the temperature compensator 28 in a variety of manners, including by means of an ultraviolet curable epoxy, a heat curable epoxy, a metallic crimp tube, a cam actuator or the like. Likewise, the first end of the temperature compensator can be attached to the end portion of the second optical fiber in a variety of manners including an ultraviolet curable epoxy, a heat curable epoxy, a metallic crimp tube, a cam actuator or the like. While the same type of attachment means can be utilized for attaching the first end of the splice tube to the first optical fiber, for attaching the second end of the splice tube to the second end of the temperature compensator and for attaching the first end of the temperature compensator to the end portion of the second optical fiber, different means of attachment can be utilized at each of these different attachment points, if so desired.

As shown in FIG. 2, end portions of the first and second optical fibers are spliced within the passageway defined by the splice tube 26. In this regard, the splice housing assembly 22 also preferably includes a splice body 30 disposed within the passageway defined by the splice tube for aligning respective end portions of the first and second optical fibers. As shown in FIG. 2, the buffer jacket has generally been stripped from the end portions of the first and second optical fibers that are spliced. In the illustrated embodiment, the splice body includes first and second portions that are urged together so as to secure the respective end portions of the first and second optical fibers in an aligned relationship therebetween. As shown in cross-section in FIG. 3, the first portion 30a preferably has an inner surface that defines at least one groove for receiving and aligning respective end portions of the first and second optical fibers. By covering the inner surface of the first portion of the splice body with the second portion 30b of the splice body, the respective end portions of the first and second optical fibers are held in an aligned relationship within a respective groove. Thus, the splice housing assembly of the present invention provides the mechanical splice without physically joining the respective end portions of the first and second optical fibers, such as by fusion, and without requiring external activation, such as cam activation on the like.

Since the splice tube 26 is formed of a material having a different coefficient of thermal expansion than the optical fibers, the splice tube will expand and contract in different amounts than the optical fibers. In this regard, the splice tube is typically formed of a plastic material which has a much greater coefficient of thermal expansion than the glass which forms the optical fibers. As such, the splice tube will expand and contract to a much greater degree than the optical fibers as the temperature increases and decreases, respectively. In order to protect the integrity of the mechanical splice, the temperature compensator 28 is formed of material selected to compensate for or offset the differences in expansion and contraction of the splice tube and the optical fibers as the temperature increases and decreases, respectively.

As illustrated in FIG. 2, a distance $L_B$ separates the point at which the first end of the splice tube 26 is connected to the first optical fiber 18 and the point at which the second end of the splice tube is connected to the second end of the temperature compensator. For purposes of illustration, dots are utilized in FIG. 2 to indicate the different points of attachment. As the temperature increases, the distance $L_B$ between the attachment points at the opposite ends of the splice tube increases at a much greater rate than the respective lengths of the first and second optical fibers. Absent the temperature compensator 28, the respective end portions of the first and second optical fibers would therefore be spread apart and the resulting mechanical splice would be significantly degraded.

According to the present invention, however, the temperature compensator 28 is not only attached at its second end to the second end of the splice tube 26, but is also attached at its first end to the end portion of the second optical fiber 24. In addition, the temperature compensator is formed of a material which is particularly selected such that fluctuations in temperature cause the temperature compensator to expand and contract in an amount which compensates for or offsets the difference in expansion and contraction between the splice tube and the first and second optical fibers. Since the distance $L_A$ between the attachment points at the first and second ends of the temperature compensator is generally much less than the distance $L_B$ between the attachment points at the first and second ends of the splice tube as explained below, the material which forms the temperature compensator must generally have a coefficient of thermal expansion that is much greater than the coefficient thermal expansion of the material which forms the splice tube. As such, the temperature compensator will expand and, therefore, lengthen at a much greater rate than the splice tube as the temperature increases in order to maintain the respective end portions of the first and second optical fibers in an abutting or adjacent relationship, thereby protecting the integrity of the mechanical splice. Similarly, the temperature compensator will contract and, therefore, shorten at a greater rate than the splice tube as the temperature decreases such that the respective end portions of the first and second optical fibers will be maintained in an abutting relationship, thereby further protecting the integrity of the mechanical splice.

As described below, the splice tube 26 is generally formed of a material which has a lower coefficient of thermal expansion than the material from which the temperature compensator 28 is formed. According to one advantageous embodiment, the materials which form the splice tube and the temperature compensator are selected such that:

$$\frac{COE_{TC}}{COE_{ST}} = \frac{L_B}{L_A}$$

As set forth in the above equation, $COE_{ST}$ and $COE_{TC}$ are the coefficients of thermal expansion of the splice tube and the temperature compensator, respectively. In addition, $L_B$ is the distance between the point at which the first end of the splice tube is attached to the first optical fiber 18 and the point at which the second end of the temperature compensator is attached to the splice tube. Further, $L_A$ is the distance between the point at which the first end of the temperature compensator is attached to the second optical fiber 24 and the point at which the second end of the temperature compensator is attached to the splice tube. As such, the differences in expansion and contraction between the splice tube and the first and second optical fibers will be offset by the expansion and contraction of the temperature compensator, thereby protecting the integrity of the mechanical splice between the respective end portions of the first and second optical fibers.

As described above, the splice tube 26 is typically comprised of a plastic material, such as an ULTEM™4000 plastic provided by GE Plastics that has a coefficient of thermal expansion of $9 \times 10^{-6}/°$ F. While the temperature compensator 28 can be formed of materials without departing from the spirit and scope of the present invention, the temperature compensator of one advantageous embodiment is formed of CYCOLOY™ MC 8100 plastic provided by GE Plastics that has a coefficient of thermal expansion of $5.5 \times 10^{-5}/°$ F. According to this embodiment, the ratio of $L_B$ to $L_A$ must therefore be approximately 5:1 to permit the expansion and contraction of the temperature compensator to offset differences between the expansion and contraction of the splice tube and the expansion and contraction of the first and second optical fibers.

As shown in FIGS. 1 and 2, the connector 10 of the present invention also generally includes a crimp body 32 at least partially disposed within the passageway defined by the inner housing 14. Preferably, the crimp body is attached to the inner housing such that the crimp body extends rearwardly through the first end of the inner housing. Although the crimp body can be attached to the inner housing in a variety of manners without departing from the spirit and scope of the present invention, the crimp body of one advantageous embodiment includes a number of outwardly extending projections which contact the inner wall which defines the passageway through the inner housing and which can be ultrasonically welded thereto.

As illustrated, the crimp body 32 defines a lengthwise extending passageway in which the splice housing assembly 22 is at least partially disposed. As shown in FIGS. 1 and 2, the passageway defined by the crimp body is preferably enlarged at one end for housing the spring 20 which biases the ferrule 16 outwardly through the second end of the inner housing 14.

In order to provide strain relief for the second optical fiber 24 that is inserted through the second end of the splice tube 26, the strength members 34 of the fiber optic cable 13 that includes the second optical fiber, such as the KEVLAR™ yarn which surrounds the second optical fiber, can be crimped between the crimp band 36 and a rear portion of the crimp body 32 that the crimp band encircles. As known to those skilled in the art, the crimp body and crimp band are therefore typically formed of a metallic material.

Once the internal portion of the connector 10 has been mounted upon the end portion of the second optical fiber 24 and the crimp band 36 has been compressed about the crimp body 32, the outer housing 12 can be attached to the inner housing, as indicated in FIG. 4. Although the outer housing can be attached to the inner housing in a number of different manners as known to those skilled in the art, the outer housing of the illustrated embodiment is typically snap-fit over the inner housing such that the outer housing is slidably disposed relative to the inner housing. As also shown in FIG. 4, a boot 38 is typically advanced over the crimp band so as to fractionally engage the crimp band and crimp body.

Although the splice housing assembly 22 of the present invention has been described and illustrated in conjunction with a connector 10, the splice housing assembly can be utilized separate and apart from a connector or any other type of housing without departing from the spirit and scope of the present invention. For example, the splice housing assembly can splice two sets of optical fibers, neither of which have been connectorized.

Therefore, the splice housing assembly 22 and the associated connector 10 of the present invention provide a non-activated mechanical splice that provides temperature compensation such that the resulting splice is substantially unaffected by temperature fluctuations, thereby permitting the splice housing assembly and the associated connector to be formed of relatively inexpensive materials, such as plastic, without compromising the quality of the resulting splice.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A splice housing assembly for optically interconnecting first and second optical fibers, the splice housing assembly comprising:

a splice tube extending lengthwise between opposed first and second ends and defining a lengthwise extending passageway, wherein the first end of said splice tube is adapted to receive and be attached to an end portion of the first optical fiber;

a splice body disposed within the passageway defined by said splice tube for aligning respective end portions of the first and second optical fibers; and a temperature compensator disposed at least partially within the passageway of said splice tube, said temperature compensator extending between opposed first and second ends and defining an opening through which the end portion of the second optical fiber extends, wherein the first end of said temperature compensator is adapted to be attached to the second optical fiber and the second end of said temperature compensator is attached to said splice tube, and wherein said temperature compensator and said splice tube are formed of different materials that are selected such that changes in length of said splice tube as a result of temperature variations are at least partially offset by changes in length of said temperature compensator.

2. A splice housing assembly according to claim 1 wherein the material from which said splice tube is formed has a lower coefficient of thermal expansion than the material from which said temperature compensator is formed.

3. A splice housing assembly according to claim 1 wherein the materials which form said splice tube and said temperature compensator are selected such that:

$$\frac{COE_{TC}}{COE_{ST}} = \frac{L_B}{L_A}$$

wherein $COE_{ST}$ and $COE_{TC}$ are the coefficients of thermal expansion of said splice tube and said temperature compensator, respectively, wherein $L_B$ is the distance between the point at which the first end of said splice tube is attached to the first optical fiber and the point at which the second end of said temperature compensator is attached to said splice tube, and wherein $L_A$ is the distance between the point at which the first end of said temperature compensator is attached to the second optical fiber and the point at which the second end of said temperature compensator is attached to said splice tube.

4. A splice housing assembly according to claim 1 wherein the second end of said temperature compensator is attached to the second end of said splice tube.

5. A splice housing assembly according to claim 1 wherein said splice body comprises:

a first portion having an inner surface that defines at least one groove for receiving and aligning respective end portions of the first and second optical fibers; and a second portion for mating with said first portion to secure the respective end portions of the first and second optical fibers within the respective groove.

6. A splice housing assembly for optically interconnecting first and second optical fibers, the splice housing assembly comprising:

a splice tube extending lengthwise between opposed first and second ends and defining a lengthwise extending passageway, wherein said splice tube is formed of a first material, and wherein the first end of said splice tube is adapted to receive and be attached to an end portion of the first optical fiber; and a temperature compensator disposed at least partially within the passageway of said splice tube, said temperature compensator extending between opposed first and second ends and defining an opening through which the end portion of the second optical fiber extends, wherein the first end of said temperature compensator is adapted to be attached to the second optical fiber and the second end of said temperature compensator is attached to said splice tube, and wherein said temperature compensator is formed of a second material having a greater coefficient of thermal expansion than the first material from which said splice tube is formed such that changes in length of said splice tube as a result of temperature variations are at least partially offset by changes in length of said temperature compensator.

7. A splice housing assembly according to claim 6 wherein the materials which form said splice tube and said temperature compensator are selected such that:

$$\frac{COE_{TC}}{COE_{ST}} = \frac{L_B}{L_A}$$

wherein $COE_{ST}$ and $COE_{TC}$ are the coefficients of thermal expansion of said splice tube and said temperature compensator, respectively, wherein $L_B$ is the distance between the point at which the first end of said splice tube is attached to the first optical fiber and the point at which the second end of said temperature compensator is attached to said splice tube, and wherein $L_A$ is the distance between the point at which the first end of said temperature compensator is attached to the second optical fiber and the point at which the second end of said temperature compensator is attached to said splice tube.

8. A splice housing assembly according to claim 6 wherein the second end of said temperature compensator is attached to the second end of said splice tube.

9. A splice housing assembly according to claim 6 further comprising a splice body disposed within the passageway defined by said splice tube for aligning respective end portions of the first and second optical fibers.

10. A splice housing assembly according to claim 9 wherein said splice body comprises:

a first portion having an inner surface that defines at least one groove for receiving and aligning respective end portions of the first and second optical fibers; and a second portion for mating with said first portion to secure the respective end portions of the first and second optical fibers within the respective groove.

11. A connector comprising:

a housing extending between opposed first and second ends and defining a lengthwise extending passageway;

a ferrule mounted upon an end portion of a second optical fiber, said ferrule at least partially disposed within the passageway defined by said housing proximate the second end of said housing; and a splice housing assembly for optically interconnecting a first optical fiber and the second optical fiber, said splice housing assembly at least partially disposed within the passageway defined by said housing proximate the first end of said housing, said splice housing assembly comprising:

a splice tube extending lengthwise between opposed first and second ends and defining a lengthwise extending passageway, wherein the first end of said splice tube is adapted to receive and be attached to an end portion of the second optical fiber; and a temperature compensator disposed at least partially within the passageway of said splice tube, said temperature compensator extending between opposed first and second ends and defining an opening through which the end portion of the second optical fiber extends, wherein the first end of said temperature compensator is adapted to be attached to the end portion of the second optical fiber and the second end of said temperature compensator is attached to said splice tube, and wherein said temperature compensator and said splice tube are formed of different materials that are selected such that changes in length of said splice tube as a result of temperature variations are at least partially offset by changes in length of said temperature compensator.

12. A connector according to claim 11 wherein the material from which said splice tube is formed has a lower coefficient of thermal expansion than the material from which said temperature compensator is formed.

13. A connector according to claim 11 wherein the materials which form said splice tube and said temperature compensator are selected such that:

$$\frac{COE_{TC}}{COE_{ST}} = \frac{L_B}{L_A}$$

wherein $COE_{ST}$ and $COE_{TC}$ are the coefficients of thermal expansion of said splice tube and said temperature compensator, respectively, wherein $L_B$ is the distance between the point at which the first end of said splice tube is attached to the first optical fiber and the point at which the second end of said temperature compensator is attached to said splice tube, and wherein $L_A$ is the distance between the point at which the first end of said temperature compensator is attached to the second optical fiber and the point at which the second end of said temperature compensator is attached to said splice tube.

14. A connector according to claim 11 wherein the second end of said temperature compensator is attached to the second end of said splice tube.

15. A connector according to claim 11 further comprising a splice body disposed within the passageway defined by said splice tube for aligning respective end portions of the first and second optical fibers.

16. A connector according to claim 15 wherein said splice body comprises:

a first portion having an inner surface that defines at least one groove for receiving and aligning respective end portions of the first and second optical fibers; and a second portion for mating with said first portion to secure the respective end portions of the first and second optical fibers within the respective groove.

* * * * *